Oct. 18, 1932.    S. M. EDBERG    1,883,355
TRANSMISSION
Filed March 30, 1929    2 Sheets-Sheet 1

Inventor
S. M. Edberg
By Watson E. Coleman
Atty.

Oct. 18, 1932.　　　S. M. EDBERG　　　1,883,355
TRANSMISSION
Filed March 30, 1929　　2 Sheets-Sheet 2
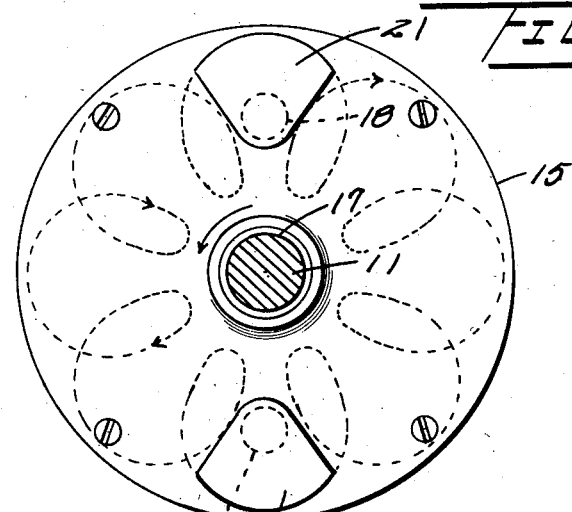
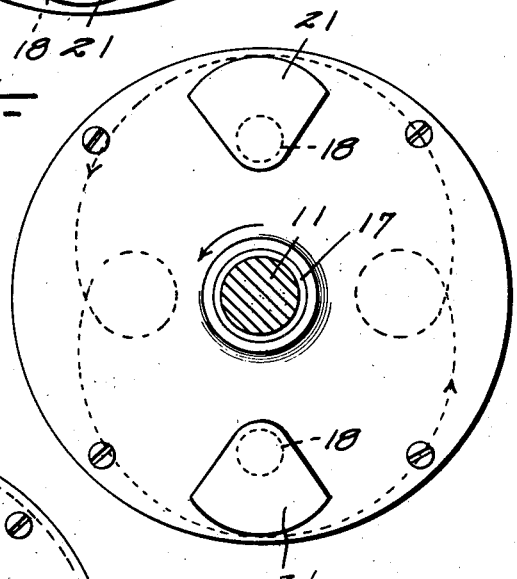
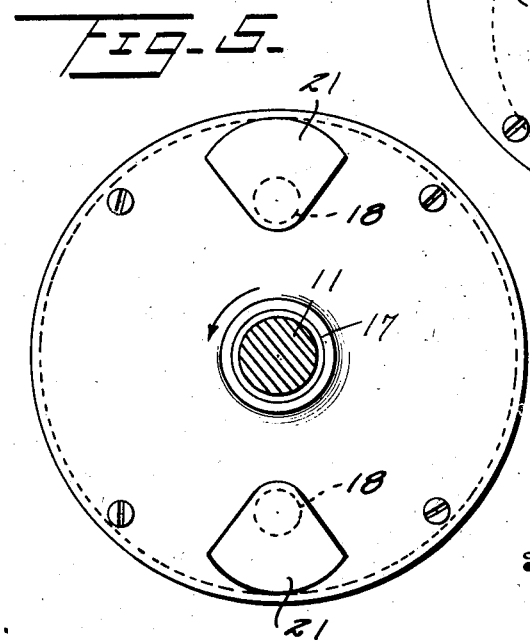
Inventor
S. M. Edberg
By Watson E. Coleman
Attorney Patented Oct. 18, 1932

1,883,355

UNITED STATES PATENT OFFICE

SILAS M. EDBERG, OF BISMARCK, NORTH DAKOTA, ASSIGNOR OF TWENTY PER CENT TO JOSEPH P. SPIES AND FORTY-FIVE PER CENT TO MELVIN O. STEEN, BOTH OF BISMARCK, NORTH DAKOTA

TRANSMISSION

Application filed March 30, 1929. Serial No. 351,395.

This invention relates to transmissions and has for a particular object thereof the production of a transmission wherein a continuous variation in driving speed may be had from a much reduced low speed to a high speed wherein the driven shaft is operating at the same speed as the driving shaft.

A further object of the invention is to produce in apparatus of this character, a structure such that the changes are all automatic, and the use of clutches and shifting gears is eliminated.

A still further object is the production of apparatus of this character, which may be very cheaply manufactured, which will be durable and efficient in service, and a general improvement in the art.

A further and more specific object of the invention is to produce a transmission in which the drive is imparted through weight controlled gears which as the speed of the driven shaft picks up, assume a certain position in response to centrifugal force locking the driving to the driven gear until the load upon the driven gear is such that these centrifugal forces are overcome when the weight will move from this position and by its movement permit a reduction of the speed until the balance of force and load is again established.

A still further object of this invention is to provide a transmission of this character which when applied to an automobile will limit the necessary controls to a means for accelerating the engine, and a brake for holding the driven shaft inoperative.

These and other objects I attain by the construction shown in the accompanying drawings wherein for the purpose of illustration I have shown a preferred embodiment of my invention and wherein:—

Figures 3, 4 and 5 are views illustrating diagrammatically the operation of transmission weights to low, intermediate and high speeds.

Figure 1:
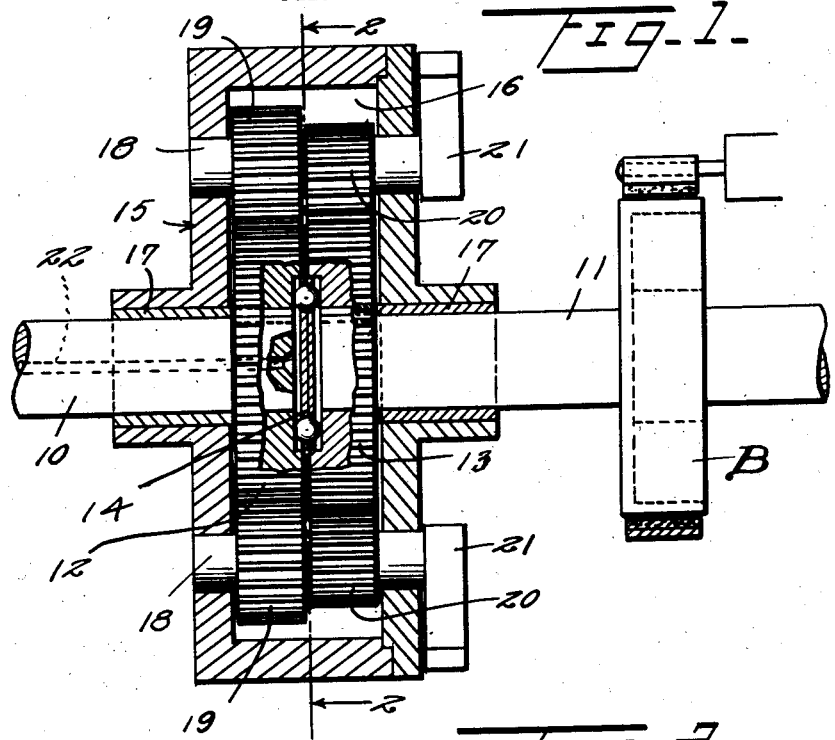
Figure 1 is a vertical sectional view through a transmission constructed in accordance with my invention, parts being broken away.
Figure 2:
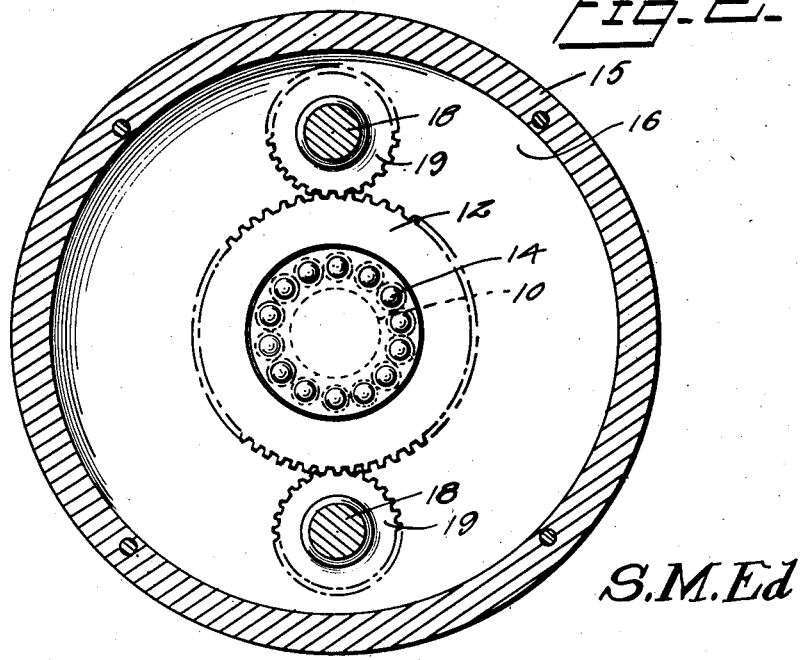
Figure 2 is a section on line 2—2 of Figure 1.

Referring now more particularly to the drawings, the numeral 10 indicates a driving and 11, a driven shaft, adjacent ends of which have secured thereto driving and driven gears 12 and 13. These gears are preferably of different sizes, the driven gear 13 being larger. Between the driving and driven gears a thrust element 14 of any suitable character may be interposed.

The numeral 15 designates a casing enclosing driving and driven gears 13 and of such diameter as to produce about these gears an annular space 16. End walls of this casing rotatably receive both the driving and driven shafts, as indicated at 17, and these end walls have rotatably mounted therein a plurality of shafts 18 extending through the annular space 16 and having their axes parallel to the axes of the driving and driven shafts. Each shaft 18 has secured thereto within the casing a compound gear including an element 19 engaging the driving gear 12 and an element 20 engaging the driven gear 13. Each shaft has one end thereof projected through an end wall of the casing and provided with a weight 21 which is eccentrically secured to the shaft. These weights when attached occupy similar positions, that is to say, each weight 21 projects outwardly from its shaft when the corresponding weight of the other shaft is similarly projected.

In use of apparatus of this character, a brake B must be associated with the driven shaft. In the present instance this brake has been illustrated as directly engaged with the shaft but it will, of course, be obvious that this brake might constitute the ordinary wheel brakes of an automobile and accordingly be associated with a shaft driven by the driving shaft. When the brake B is applied and the shaft 10 is driven, the casing 15 will rotate gears 19 and 20 idly upon the gears 12 and 13. This causes a rotation of shafts 18 and a corresponding rotation of the eccentric weights and the forces generated by the operation of these weights is acting to move shaft 11 against the grip of the brake. The force supplied will, of course, depend upon the speed of operation of shaft 10.

When brake B is released these forces will start rotation of shaft 11 provided they are sufficient to over-come the inertia of the shaft. If they are insufficient the shaft 10 may be speeded up to over-come this inertia and rotation of shaft 11 starts. As the shaft 11 picks up in in speed and the forces required for driving the same reduce, rotation of shafts 18 upon their axes will decrease, subjecting these weights more and more to the centrifugal force generated by rotation of casing 15, until finally these weights stop their rotation while extended outwardly from the shafts 18. Shafts 18 become stationary and gears 12 and 13 are locked to one another through the compound gear elements of the shafts 18, so that shafts 10 and 11 are rotating as a unit.

It will be obvious that apparatus of this character may be very readily and cheaply manufactured, will be durable and efficient in service because of the small number of working parts employed and will provide an entirely automatic connection between driving and driven shafts when employed as the transmission of an automobile. The apparatus is particularly efficient in that the structure may be conveniently directly attached to the crank shaft of the engine and during operation at high speeds when the casing and gearing are rotating as a unit, will provide a substantial flywheel effect while in low gear but little flywheel effect will be noted, thus providing for greater acceleration of the low and intermediate speeds. Furthermore, by employing this structure the shaft conduit 22 usually employed for conducting oil to the bearings of the engine may be continued and employed to supply lubricant to the gearing as indicated.

It will, of course, be obvious that in employing a device of this character in an automobile some means must be provided for producing reverse operation. This may consist of transmission disposed in advance of my transmission having forward reverse and neutral positions. Since such a transmission may be of any desired construction I have not illustrated the same herein.

Since the structure employed is obviously capable of a very considerable range of change and modification without in any manner departing from the spirit of the invention, I accordingly do not limit myself to such specific structure except as hereinafter claimed.

I claim:

1. In an automatic transmission and in combination with aligned driving and driven shafts having gears upon their adjacent ends, a housing freely rotatable upon said shafts about said gears, a plurality of shafts rotatably mounted in said housing one end of shafts extending outwardly of said housing, gears mounted in the housing and upon said latter shafts, said latter gears engaging with said first gears and a weight eccentrically carried by said latter shafts outwardly of the housing said housing coacting with said weights to automatically control the rotation of said driven shaft.

2. In an automatic transmission and in combination with aligned driving and driven shafts having gears upon their adjacent ends, a housing carried by said shafts freely rotatable about said gears, a plurality of off-set shafts mounted in said housing and having extensions projecting outwardly of the housing, planet gears mounted on said off-set shafts and engaging with said driving and driven gears and a weight eccentrically carried by each off-set shaft exteriorly of said housing and adapted for circumferential movement thereof said housing coacting with said weights to automatically control the rotation of said driven shaft.

3. In an automatic transmission and in combination with aligned driving and driven shafts having gears upon their adjacent ends, a rotatable housing carried by said shafts, said housing comprising an annular member, means for rotatably mounting said annular member on one of said shafts, an annular flange outstanding from said annular member, a second annular member adapted to engage the outer end of said flange, means for rotatably mounting said second annular member on the other of said shafts and securing means for holding said second annular member against movement with respect to said flange, a plurality of off-set shafts rotatably mounted in each of said annular members of said housing said shafts being adapted to project outwardly of said second annular member, gears on said off-set shafts engaging with said driving and driven gears and a weight eccentrically carried by each off-set shaft exteriorly of said second annular member said housing coacting with said weights to automatically control the rotation of said driven shaft.

4. In an automatic transmission and in combination with aligned driving and driven shafts having gears upon their adjacent ends, a rotatable housing carried by said shafts, a plurality of off-set shafts rotatably mounted in said housing and having one end thereof projecting outwardly of the housing, gears secured to said off-set shafts and adapted to engage with said driving and driven gears, a weight eccentrically secured to each off-set shaft on said projecting portions and adapted for rotation therewith whereby to control the rotation of said driven shaft, an antifriction element between the inner ends of the driving and driven shafts and brake means on the driven shaft said housing coacting with said weights to automatically control the rotation of said driven shaft.

5. An automatic transmission comprising abutting gear members, a plurality of offset shafts, pairs of gears carried by said shafts and meshing with said first gear members, weights carried by each of said shafts, and a member enclosing all of said gears and freely rotatable about said first gears coacting with said weights whereby to automatically control the speed of rotation of one of said abutting gears with respect to the other abutting gear.

In testimony whereof I hereunto affix my signature.

SILAS M. EDBERG.